J. M. SAVILL.
Stalk-Cutters.
No. 129,427.  Patented July 16, 1872.
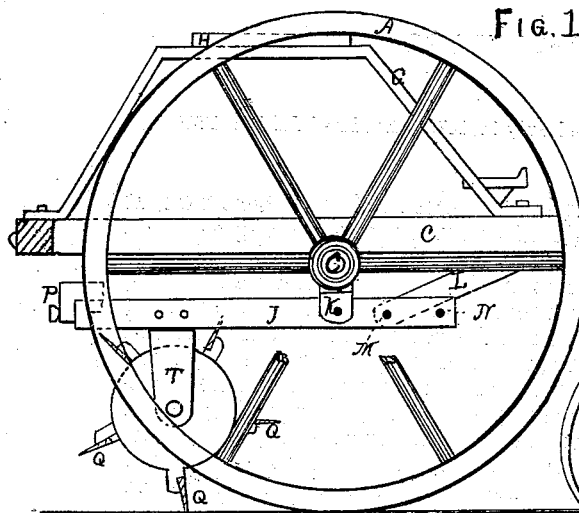
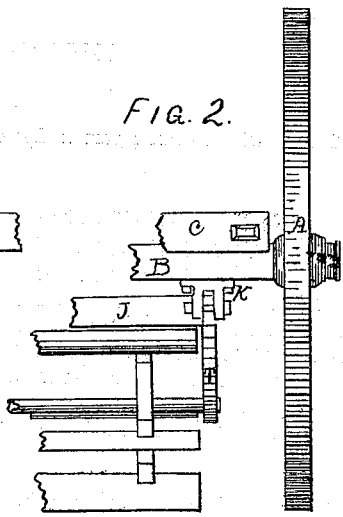
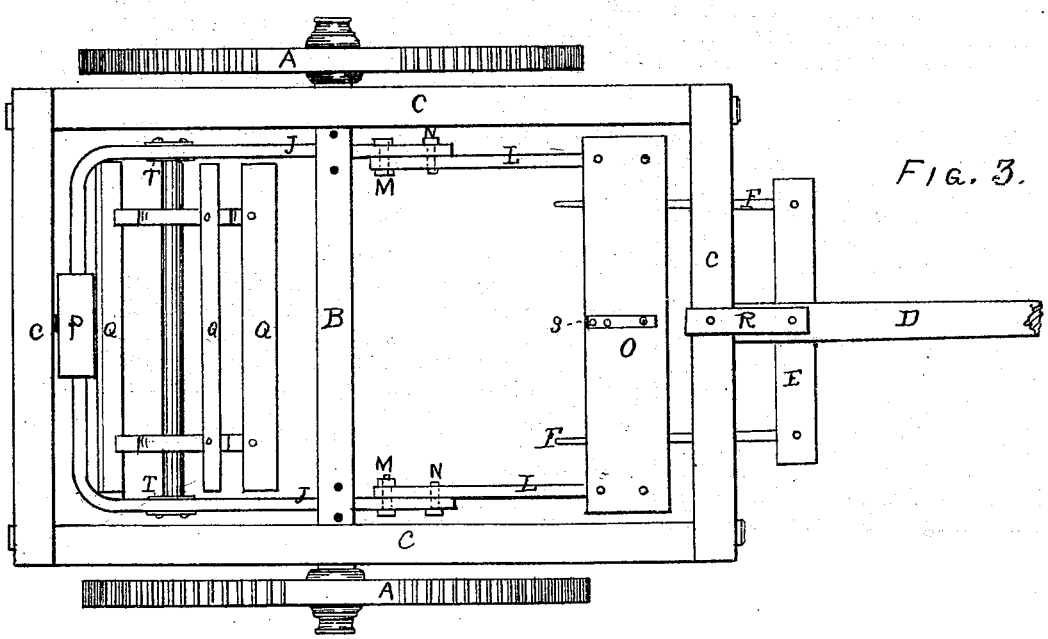
Witnesses:
Daniel Abbott
W. H. Haskell.
Inventor:
Jeremiah M. Savill

UNITED STATES PATENT OFFICE.

JEREMIAH M. SAVILL, OF CANTON, ILLINOIS, ASSIGNOR TO HIMSELF AND GIDEON W. COLE, OF SAME PLACE.

IMPROVEMENT IN STALK-CUTTERS.

Specification forming part of Letters Patent No. 129,427, dated July 16, 1872; antedated July 13, 1872.

SPECIFICATION.

I, JEREMIAH M. SAVILL, of Canton, in the county of Fulton and State of Illinois, have invented certain Improvements in Stalk-Cutters, of which the following is a specification:

My improvements consist in the manner of making, connecting, and operating the frame which contains or carries the cylinder of cutting-knives, as stalk-cutters are now generally made.

*Description of Accompanying Drawing.*

Figure 1 is a side elevation of a machine, the lower spokes of wheel being cut away to show coupling-box. Fig. 2 is a section of a rear elevation of a machine. Fig. 3 is a plan of same without driver's seat or foot-board.

*General Description.*

A is the carriage or draft-wheel. B is the axle; C, the riding-frame, with tongue D, under which is secured the cross-bar E, to which are attached the gathering-hooks F that rake the stalks lengthwise in the furrow. G is the iron trestle which supports cross-board, by which the driver's seat H is sufficiently raised to enable him to operate with ease the treadle-board. All the parts above lettered and described are made of any approved material and style. The frame J is made of bar-iron, (size of bar, about one-half by two and a half inches,) and is connected to the axle by the coupling-boxes K, which are bolted to the under side of axle. To the front ends of the sides of the frame J are hinged the iron bars L L, working on the bolts M M, and these bars, at an angle of about twenty-five degrees, rest upon the iron pins N N fixed in J, and their front ends are bolted to the treadle-board O, making a rectangular frame of J L L and O, but hinged on the bolts M M. On the rear end of J is the cast-iron weight P, secured by a set-screw, and of proper size to give sufficient cutting force to the knives Q. Projecting a little inside of the frame C, and coupling the tongue, is fixed the iron strip R. To the treadle-board is secured the spring-lever S, with a lip-stop in its front edge so made and fixed that when the treadle-board is weighed down the stop in edge of spring will catch on edge of strip R and hold the rear end up and off the ground. The cast-iron brackets T are bolted to the sides of J and receive the ends of the shaft of cutting-cylinder.

The operating of this stalk-cutter is apparent from the drawing and the above specification.

*Claim.*

I claim as my invention—

The pivoted frame J, constructed substantially as described, and having stop-pins N, in combination with the pivoted bars L, treadle-board O, lever S, and catch R, for the purpose of supporting and operating the cutter-cylinder, as set forth.

JEREMIAH M. SAVILL.

Witnesses:
DANIEL ABBOTT,
W. H. HASKELL.